US012394275B2

(12) United States Patent
Attard et al.

(10) Patent No.: US 12,394,275 B2
(45) Date of Patent: *Aug. 19, 2025

(54) GAMING MACHINE AND METHOD WITH A SYMBOL COLLECTION FEATURE

(71) Applicant: LNW Gaming, Inc., Las Vegas, NV (US)

(72) Inventors: Bernadine Attard, Castlereagh (AU); David Little, Woollahra (AU)

(73) Assignee: LNW Gaming, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/734,108

(22) Filed: Jun. 5, 2024

(65) Prior Publication Data

US 2024/0321042 A1 Sep. 26, 2024

Related U.S. Application Data

(63) Continuation of application No. 18/315,606, filed on May 11, 2023, now Pat. No. 12,039,833, which is a continuation of application No. 17/584,660, filed on Jan. 26, 2022, now Pat. No. 11,710,370.

(51) Int. Cl.
*G07F 17/32* (2006.01)

(52) U.S. Cl.
CPC ...... *G07F 17/3213* (2013.01); *G07F 17/3258* (2013.01); *G07F 17/3267* (2013.01)

(58) Field of Classification Search
None
See application file for complete search history.

(56) References Cited

U.S. PATENT DOCUMENTS

| | | | |
|---|---|---|---|
| 3,733,075 | A | 5/1973 | Hooker et al. |
| 4,198,052 | A | 4/1980 | Gauselmann |
| 4,732,386 | A | 3/1988 | Rayfiel |
| 5,100,137 | A | 3/1992 | Fulton |
| 5,152,529 | A | 10/1992 | Okada |
| 5,205,555 | A | 4/1993 | Hamano |
| 5,342,047 | A | 8/1994 | Heidel et al. |
| 5,356,140 | A | 10/1994 | Dabrowski et al. |
| 5,393,061 | A | 2/1995 | Manship et al. |
| 5,395,111 | A | 3/1995 | Inoue |
| 5,431,408 | A | 7/1995 | Adams |

(Continued)

FOREIGN PATENT DOCUMENTS

| | | | |
|---|---|---|---|
| AU | 2001055957 | A1 | 3/2002 |
| AU | 2013251288 | A1 | 5/2014 |

(Continued)

OTHER PUBLICATIONS

Ancient Arcadia game brochure, Copyright 2011 IGT.

(Continued)

*Primary Examiner* — Jason T Yen

(57) ABSTRACT

There is provided a gaming method and system that utilize a presentation assembly configured to present a series of spins of a plurality of reels arranged in an array, the plurality of reels including value-bearing symbols, wherein any value-bearing symbol that lands in an active subset of the array is collected in a collection area. At a conclusion of the series of spins, a payout based on the values of the collected value-bearing symbols is awarded.

20 Claims, 5 Drawing Sheets

(56) References Cited

U.S. PATENT DOCUMENTS 5,511,781 A 4/1996 Wood et al.
5,618,232 A 4/1997 Martin
5,695,188 A 12/1997 Ishibashi
5,704,835 A 1/1998 Dietz
5,722,891 A 3/1998 Inoue
5,752,881 A 5/1998 Inoue
5,766,074 A 6/1998 Cannon et al.
5,788,573 A 8/1998 Baerlocher et al.
5,807,177 A 9/1998 Takemoto et al.
5,810,665 A 9/1998 Takemoto et al.
5,833,537 A 11/1998 Barrie
5,848,932 A 12/1998 Adams
5,855,515 A 1/1999 Pease et al.
5,876,284 A 3/1999 Acres et al.
5,882,259 A 3/1999 Holmes et al.
5,882,261 A 3/1999 Adams
5,890,962 A 4/1999 Takemoto
5,911,418 A 6/1999 Adams
5,947,820 A 9/1999 Morro et al.
5,951,397 A 9/1999 Dickinson
5,988,638 A 11/1999 Rodesch et al.
6,004,207 A 12/1999 Wilson et al.
6,027,115 A 2/2000 Griswold et al.
6,033,307 A 3/2000 Vancura
6,048,269 A 4/2000 Burns et al.
6,050,895 A 4/2000 Luciano et al.
6,056,642 A 5/2000 Bennett
6,089,976 A 7/2000 Schneider et al.
6,089,977 A 7/2000 Bennett
6,102,798 A 8/2000 Bennett
6,120,031 A 9/2000 Adams
6,142,873 A 11/2000 Weiss et al.
6,159,097 A 12/2000 Gura
6,162,121 A 12/2000 Morro et al.
6,168,520 B1 1/2001 Baerlocher et al.
6,186,894 B1 2/2001 Mayeroff
6,203,429 B1 3/2001 Demar et al.
6,213,875 B1 4/2001 Suzuki
6,224,482 B1 5/2001 Bennett
6,224,483 B1 5/2001 Mayeroff
6,224,484 B1 5/2001 Okuda et al.
6,227,971 B1 5/2001 Weiss
6,241,607 B1 6/2001 Payne et al.
6,251,013 B1 6/2001 Bennett
6,270,411 B1 8/2001 Gura et al.
6,270,412 B1 8/2001 Crawford et al.
6,290,600 B1 9/2001 Glasson
6,309,300 B1 10/2001 Glavich
6,319,124 B1 11/2001 Baerlocher et al.
6,375,567 B1 4/2002 Acres
6,375,570 B1 4/2002 Poole
6,413,162 B1 7/2002 Baerlocher et al.
6,481,713 B2 11/2002 Perrie et al.
6,517,432 B1 2/2003 Jaffe
6,517,433 B2 2/2003 Loose et al.
6,537,150 B1 3/2003 Luciano et al.
6,544,120 B2 4/2003 Ainsworth
6,547,242 B1 4/2003 Sugiyama et al.
6,551,187 B1 4/2003 Jaffe
6,554,704 B2 4/2003 Nicastro et al.
6,558,254 B2 5/2003 Baelocher et al.
6,561,900 B1 5/2003 Baerlocher et al.
6,561,904 B2 5/2003 Locke et al.
6,565,434 B1 5/2003 Acres
6,641,477 B1 11/2003 Dietz
6,652,378 B2 11/2003 Cannon et al.
6,656,040 B1 12/2003 Brosnan et al.
6,657,923 B2 12/2003 Laughlin
6,692,356 B2 2/2004 Baerlocher et al.
6,702,675 B2 3/2004 Poole et al.
6,731,313 B1 5/2004 Kaminkow
6,786,818 B1 9/2004 Rothschild et al.
6,832,957 B2 12/2004 Falconer
6,837,790 B1 1/2005 Kaminkow
6,869,360 B2 3/2005 Marks et al.
6,896,617 B2 5/2005 Daly
6,910,962 B2 6/2005 Marks et al.
6,916,243 B2 7/2005 Yoshida
6,918,834 B2 7/2005 Vancura
6,926,609 B2 8/2005 Martin
6,960,134 B2 11/2005 Hartl et al.
7,018,293 B2 3/2006 Brown et al.
7,029,395 B1 4/2006 Baerlocher
7,029,396 B2 4/2006 Jaffe et al.
7,108,602 B2 9/2006 Daly
7,121,945 B2 10/2006 Suganuma et al.
7,147,559 B2 12/2006 Englman
7,156,740 B2 1/2007 Kaminkow
7,179,169 B2 2/2007 Beaulieu et al.
7,252,591 B2 8/2007 Van Asdale
7,316,613 B2 1/2008 Luccesi et al.
7,351,144 B2 4/2008 Daly
7,361,089 B2 4/2008 Daly et al.
7,371,170 B2 5/2008 Cregan et al.
7,377,850 B2 5/2008 Shackelford et al.
7,431,646 B2 10/2008 Jackson
7,452,276 B2 11/2008 Loose et al.
7,458,890 B2 12/2008 Loose et al.
7,488,252 B2 2/2009 Griswold et al.
7,503,847 B2 3/2009 Baerlocher
7,526,736 B2 4/2009 Kaminkow et al.
7,553,231 B2 6/2009 Rodgers et al.
7,578,735 B2 8/2009 Frizzell et al.
7,601,062 B2 10/2009 Cole et al.
7,604,538 B2 10/2009 Pacey
7,611,406 B2 11/2009 Fuller
7,618,319 B2 11/2009 Casey et al.
7,625,278 B2 12/2009 Paulsen et al.
7,654,895 B2 2/2010 Pacey
7,654,899 B2 2/2010 Durham et al.
7,699,699 B2 4/2010 Gilliland et al.
7,704,141 B1 4/2010 Marks et al.
7,744,460 B2 6/2010 Walker et al.
7,785,191 B2 8/2010 Marks et al.
7,789,744 B2 9/2010 Fiden
7,841,934 B2 11/2010 Gauselmann
7,927,204 B2 4/2011 Debrabander, Jr. et al.
7,950,994 B2 5/2011 Berman et al.
7,980,936 B2 7/2011 Mead
8,021,223 B2 9/2011 Rose
8,021,225 B2 9/2011 Okada
8,057,303 B2 11/2011 Rasmussen et al.
8,066,563 B1 11/2011 Schultz et al.
8,083,581 B2 12/2011 Marks et al.
8,105,145 B2 1/2012 Jaffe
8,105,151 B2 1/2012 Caputo et al.
8,113,940 B2 2/2012 Hornik
8,147,322 B2 4/2012 Walker et al.
8,162,740 B2 4/2012 Aoki
8,162,741 B2 4/2012 Wadleigh et al.
8,192,275 B2 6/2012 Aoki et al.
8,226,459 B2 7/2012 Barrett et al.
8,246,442 B1 8/2012 Barrie
8,272,938 B2 9/2012 Gilmore et al.
8,287,357 B2 10/2012 Evans
8,323,091 B2 12/2012 Frank et al.
8,357,041 B1 1/2013 Saunders
8,360,851 B2 1/2013 Aoki et al.
8,366,538 B1 2/2013 Saunders et al.
8,371,930 B1 2/2013 Saunders et al.
8,388,432 B2 3/2013 Mattice et al.
8,414,380 B2 4/2013 Saunders et al.
8,465,358 B2 6/2013 Kemper
8,496,522 B2 7/2013 Caputo et al.
8,512,121 B2 8/2013 Macvittie et al.
8,512,124 B2 8/2013 Bramble et al.
8,512,138 B2 8/2013 Saunders
8,523,659 B2 9/2013 Evans
8,574,059 B2 11/2013 Rodgers et al.
8,591,330 B2 11/2013 Kelly et al.
8,602,868 B2 12/2013 Johnson et al.
8,608,545 B2 12/2013 Arora et al.
8,662,986 B2 3/2014 Rodgers et al.
8,678,908 B2 3/2014 Nicely

(56) References Cited

U.S. PATENT DOCUMENTS

| | | | |
|---|---|---|---|
| 8,690,660 | B2 | 4/2014 | Saunders et al. |
| 8,696,434 | B2 | 4/2014 | Tsukahara |
| 8,702,487 | B2 | 4/2014 | Thomas |
| 8,771,054 | B2 | 7/2014 | Aoki et al. |
| 8,790,169 | B2 | 7/2014 | Saunders |
| 8,795,059 | B2 | 8/2014 | Aoki et al. |
| 8,821,254 | B2 | 9/2014 | Tsukahara |
| 8,834,258 | B2 | 9/2014 | Gobe et al. |
| 8,851,974 | B2 | 10/2014 | Caputo et al. |
| 8,870,642 | B2 | 10/2014 | Leupp et al. |
| 8,882,578 | B2 | 11/2014 | Saunders |
| 8,961,291 | B2 | 2/2015 | Dias Pires et al. |
| 9,005,022 | B2 | 4/2015 | Saunders |
| 9,011,233 | B2 | 4/2015 | Ryan |
| 9,098,847 | B2 | 8/2015 | Basallo et al. |
| 9,098,973 | B2 | 8/2015 | Basallo et al. |
| 9,147,321 | B2 | 9/2015 | Moody |
| 9,165,433 | B2 | 10/2015 | Caputo |
| 9,177,447 | B2 | 11/2015 | Zoltewicz et al. |
| 9,202,345 | B2 | 12/2015 | Zoltewicz et al. |
| 9,214,011 | B2 | 12/2015 | Wei et al. |
| 9,230,410 | B2 | 1/2016 | Saunders et al. |
| 9,245,421 | B2 | 1/2016 | Saunders et al. |
| 9,251,667 | B2 | 2/2016 | Marks et al. |
| 9,257,017 | B2 | 2/2016 | Saunders et al. |
| 9,262,895 | B2 | 2/2016 | Rodgers et al. |
| 9,275,524 | B2 | 3/2016 | Nicely |
| 9,299,224 | B2 | 3/2016 | Leupp |
| 9,311,781 | B2 | 4/2016 | Edwards |
| 9,349,251 | B2 | 5/2016 | Caputo et al. |
| 9,355,528 | B2 | 5/2016 | Nicely |
| 9,418,521 | B1 | 8/2016 | Henrick et al. |
| 9,424,720 | B2 | 8/2016 | Suda |
| 9,430,900 | B2 | 8/2016 | Zoltewicz et al. |
| 9,466,169 | B2 | 10/2016 | Basallo et al. |
| 9,474,972 | B2 | 10/2016 | Lenger |
| 9,495,839 | B2 | 11/2016 | Aoki et al. |
| 9,595,157 | B2 | 3/2017 | Rasmussen et al. |
| 9,633,506 | B2 | 4/2017 | Basallo et al. |
| 9,704,342 | B2 | 7/2017 | Aoki et al. |
| 9,928,691 | B2 | 3/2018 | Olive |
| 10,013,855 | B2 | 7/2018 | Nakamura |
| 10,037,651 | B2 | 7/2018 | You et al. |
| 10,043,350 | B2 | 8/2018 | Gomez et al. |
| 10,062,237 | B2 | 8/2018 | Devine et al. |
| 10,204,473 | B2 | 2/2019 | Lenger |
| 10,242,533 | B2 | 3/2019 | Okada et al. |
| 10,339,761 | B2 | 7/2019 | Olive |
| 10,366,575 | B2 | 7/2019 | Visser |
| 10,388,112 | B2 | 8/2019 | You et al. |
| 10,410,472 | B2 | 9/2019 | Moody |
| 10,417,877 | B2 | 9/2019 | Gomez et al. |
| 10,475,294 | B2 | 11/2019 | Gomez et al. |
| 10,497,203 | B2 | 12/2019 | Elmqvist |
| 10,672,220 | B2 | 6/2020 | Lenger |
| 10,706,664 | B2 | 7/2020 | Boese et al. |
| 10,726,676 | B2 | 7/2020 | You et al. |
| 10,769,888 | B2 | 9/2020 | You et al. |
| 10,839,648 | B2 | 11/2020 | Okada et al. |
| 10,957,161 | B2 | 3/2021 | Chesworth et al. |
| 11,017,638 | B2 | 5/2021 | Chesworth et al. |
| 2001/0021666 | A1 | 9/2001 | Yoshida et al. |
| 2002/0016200 | A1 | 2/2002 | Baerlocher et al. |
| 2002/0045474 | A1 | 4/2002 | Singer et al. |
| 2002/0119818 | A1 | 8/2002 | Savio et al. |
| 2002/0155881 | A1 | 10/2002 | Yoshida |
| 2002/0183105 | A1 | 12/2002 | Cannon et al. |
| 2003/0017865 | A1 | 1/2003 | Beaulieu et al. |
| 2003/0027619 | A1 | 2/2003 | Nicastro, Sr. |
| 2003/0035346 | A1 | 2/2003 | Laughlin |
| 2003/0064782 | A1 | 4/2003 | Beaulieu et al. |
| 2003/0064801 | A1 | 4/2003 | Breckner et al. |
| 2003/0064802 | A1 | 4/2003 | Rodgers et al. |
| 2003/0069063 | A1 | 4/2003 | Bilyeu et al. |
| 2003/0130034 | A1 | 7/2003 | Suganuma et al. |
| 2003/0157980 | A1 | 8/2003 | Loose et al. |
| 2003/0216165 | A1 | 11/2003 | Singer et al. |
| 2004/0012145 | A1 | 1/2004 | Inoue |
| 2004/0023714 | A1 | 2/2004 | Asdale |
| 2004/0043815 | A1 | 3/2004 | Kaminkow |
| 2004/0048646 | A1 | 3/2004 | Visocnik |
| 2004/0092315 | A1 | 5/2004 | Boyd et al. |
| 2004/0137982 | A1 | 7/2004 | Cuddy et al. |
| 2004/0171417 | A1 | 9/2004 | Beaulieu et al. |
| 2004/0198489 | A1 | 10/2004 | Kaminkow et al. |
| 2004/0242313 | A1 | 12/2004 | Munoz |
| 2005/0054442 | A1 | 3/2005 | Anderson et al. |
| 2005/0130731 | A1 | 6/2005 | Englman et al. |
| 2005/0159208 | A1 | 7/2005 | Pacey |
| 2006/0009286 | A1 | 1/2006 | Durham et al. |
| 2006/0063588 | A1 | 3/2006 | Poole |
| 2006/0111173 | A1 | 5/2006 | Yang |
| 2006/0142080 | A1 | 6/2006 | Enzminger |
| 2006/0189369 | A1 | 8/2006 | Taylor |
| 2006/0205469 | A1 | 9/2006 | Schultz et al. |
| 2006/0247002 | A1 | 11/2006 | Yoshimi et al. |
| 2007/0060248 | A1 | 3/2007 | Rodgers et al. |
| 2007/0060255 | A1 | 3/2007 | Baerlocher et al. |
| 2007/0060275 | A1 | 3/2007 | Gilmore et al. |
| 2007/0129135 | A1 | 6/2007 | Marks et al. |
| 2007/0149267 | A1 | 6/2007 | Ross et al. |
| 2007/0281784 | A1 | 12/2007 | Seelig et al. |
| 2007/0287529 | A1 | 12/2007 | Kojima |
| 2008/0003278 | A1 | 1/2008 | Mondelo |
| 2008/0004532 | A1 | 1/2008 | Rubey et al. |
| 2008/0032784 | A1 | 2/2008 | Englman |
| 2008/0045298 | A1 | 2/2008 | Yoshizawa |
| 2008/0045320 | A1 | 2/2008 | Kato |
| 2008/0108408 | A1 | 5/2008 | Wolf |
| 2008/0108411 | A1 | 5/2008 | Jensen et al. |
| 2008/0108422 | A1 | 5/2008 | Hedrick et al. |
| 2008/0108431 | A1 | 5/2008 | Cuddy et al. |
| 2008/0132321 | A1 | 6/2008 | Pau |
| 2008/0182647 | A1 | 7/2008 | Brunet De Courssou et al. |
| 2008/0220839 | A1 | 9/2008 | Debrabander et al. |
| 2008/0274789 | A1 | 11/2008 | Singer et al. |
| 2009/0036208 | A1 | 2/2009 | Pennington et al. |
| 2009/0156287 | A1 | 6/2009 | Baumgartner |
| 2009/0181755 | A1 | 7/2009 | Gagner et al. |
| 2009/0239634 | A1 | 9/2009 | Nguyen |
| 2009/0291741 | A1 | 11/2009 | Schofield |
| 2010/0075737 | A1 | 3/2010 | Bluemel |
| 2010/0113133 | A1 | 5/2010 | Leupp |
| 2010/0167815 | A1 | 7/2010 | Gagner et al. |
| 2010/0203948 | A1 | 8/2010 | Falciglia, Sr. |
| 2010/0210343 | A1 | 8/2010 | Englman et al. |
| 2010/0234092 | A1 | 9/2010 | Gomez et al. |
| 2010/0304832 | A1 | 12/2010 | Kup-Ferroth |
| 2011/0086695 | A1 * | 4/2011 | Evans ..................... G07F 17/32 463/43 |
| 2011/0244943 | A1 | 10/2011 | Milford et al. |
| 2011/0300937 | A1 | 12/2011 | Crowder, Jr. et al. |
| 2012/0015707 | A1 | 1/2012 | Hornik et al. |
| 2012/0034965 | A1 | 2/2012 | Masen et al. |
| 2012/0077564 | A1 | 3/2012 | Collette et al. |
| 2012/0094738 | A1 | 4/2012 | Aoki et al. |
| 2012/0122532 | A1 | 5/2012 | Berman et al. |
| 2012/0178517 | A1 | 7/2012 | Montenegro et al. |
| 2012/0220360 | A1 | 8/2012 | Kelly et al. |
| 2013/0053124 | A1 | 2/2013 | Masen et al. |
| 2013/0065663 | A1 | 3/2013 | Johnson et al. |
| 2013/0102375 | A1 | 4/2013 | Aoki et al. |
| 2013/0190066 | A1 * | 7/2013 | Saunders ............ G07F 17/3213 463/20 |
| 2013/0252704 | A1 | 9/2013 | Gilbertson et al. |
| 2013/0260861 | A1 | 10/2013 | Vann et al. |
| 2013/0324217 | A1 | 12/2013 | Gilbertson et al. |
| 2014/0011569 | A1 * | 1/2014 | Saunders ................ G07F 17/32 463/20 |
| 2014/0014186 | A1 | 1/2014 | Bhattacharya et al. |
| 2014/0024429 | A1 | 1/2014 | Aoki et al. |
| 2014/0051496 | A1 | 2/2014 | Meyer |
| 2014/0141860 | A1 | 5/2014 | Meyer |

(56) References Cited

U.S. PATENT DOCUMENTS

| | | | |
|---|---|---|---|
| 2014/0162749 A1* | 6/2014 | Ryan .................. | G07F 17/3213 463/20 |
| 2014/0179396 A1 | 6/2014 | Aoki et al. | |
| 2014/0274292 A1 | 9/2014 | Suda | |
| 2014/0323198 A1 | 10/2014 | Tuck | |
| 2015/0031437 A1 | 1/2015 | Gomez et al. | |
| 2015/0141114 A1* | 5/2015 | Davis ...................... | G07F 17/34 463/20 |
| 2015/0170462 A1 | 6/2015 | Berman et al. | |
| 2015/0206386 A1 | 7/2015 | Jaffe et al. | |
| 2015/0269809 A1 | 9/2015 | Smith | |
| 2015/0287269 A1 | 10/2015 | Berman | |
| 2015/0356833 A1 | 12/2015 | Aoki et al. | |
| 2015/0379831 A1 | 12/2015 | Lee et al. | |
| 2016/0042597 A1 | 2/2016 | Olive | |
| 2016/0155303 A1 | 6/2016 | Aoki et al. | |
| 2017/0154498 A1 | 6/2017 | Olive | |
| 2017/0301177 A1* | 10/2017 | Pawloski ............ | G07F 17/3244 |
| 2017/0372558 A1 | 12/2017 | You et al. | |
| 2018/0130303 A1 | 5/2018 | Lamb | |
| 2018/0268655 A1 | 9/2018 | Olive | |
| 2018/0268659 A1 | 9/2018 | Chesworth et al. | |
| 2019/0102992 A1 | 4/2019 | You et al. | |
| 2019/0236905 A1 | 8/2019 | Washington et al. | |
| 2024/0054861 A1* | 2/2024 | Leggett ............... | G07F 17/3267 |

FOREIGN PATENT DOCUMENTS

| | | | |
|---|---|---|---|
| AU | 2014202042 | A1 | 5/2014 |
| AU | 2015210489 | A1 | 2/2016 |
| GB | 2097160 | A | 10/1982 |
| GB | 2097160 | B | 5/1984 |
| GB | 2144568 | A | 3/1985 |
| GB | 2144568 | B | 9/1985 |
| GB | 2157047 | A | 10/1985 |
| GB | 2251112 | A | 6/1992 |

OTHER PUBLICATIONS

Flying Carpet game brochure, Copyright 2008 Bally.
Golden Knight game brochure, Copyright 2010 IGT.
Sultan of Mars game brochure, Copyright 2011 IGT.
The Amulet and the Charm game brochure, Copyright 2011 IGT.
Product Sheet for "Vikings Creed," Released Oct. 2020, Slotmill Limited.
"Jack and the Beanstalk" Game Sheet, Copyright 2017 NetEnt Product Services Ltd.

* cited by examiner

GAMING MACHINE AND METHOD WITH A SYMBOL COLLECTION FEATURE

RELATED APPLICATIONS

This patent application is a continuation of U.S. patent application Ser. No. 18/315,606, filed May 11, 2023, which is a continuation of U.S. patent application Ser. No. 17/584,660, filed Jan. 26, 2022, now U.S. Pat. No. 11,710,370. Each of the above applications are incorporated herein by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022-2024, LNW Gaming, Inc.

FIELD OF THE INVENTION

The present invention relates to a technological improvement to gaming systems, gaming machines, and methods and, more particularly, to new and improved animations in connection with a feature in which value-bearing symbols are collected from a subset of an array of symbols, the sum of their values awarded at the conclusion of the collection process.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present invention, there is provided gaming methods and a system that utilize a presentation assembly configured to present a series of spins of a plurality of reels arranged in an array, the plurality of reels including value-bearing symbols, wherein any value-bearing symbol that lands in an active subset of the array is collected in a collection area. At a conclusion of the series of spins, a payout based on the values of the collected value-bearing symbols is awarded.

Additional aspects of the invention will be apparent to those of ordinary skill in the art in view of the detailed description of various embodiments, which is made with reference to the drawings, a brief description of which is provided below.

Figure 1:
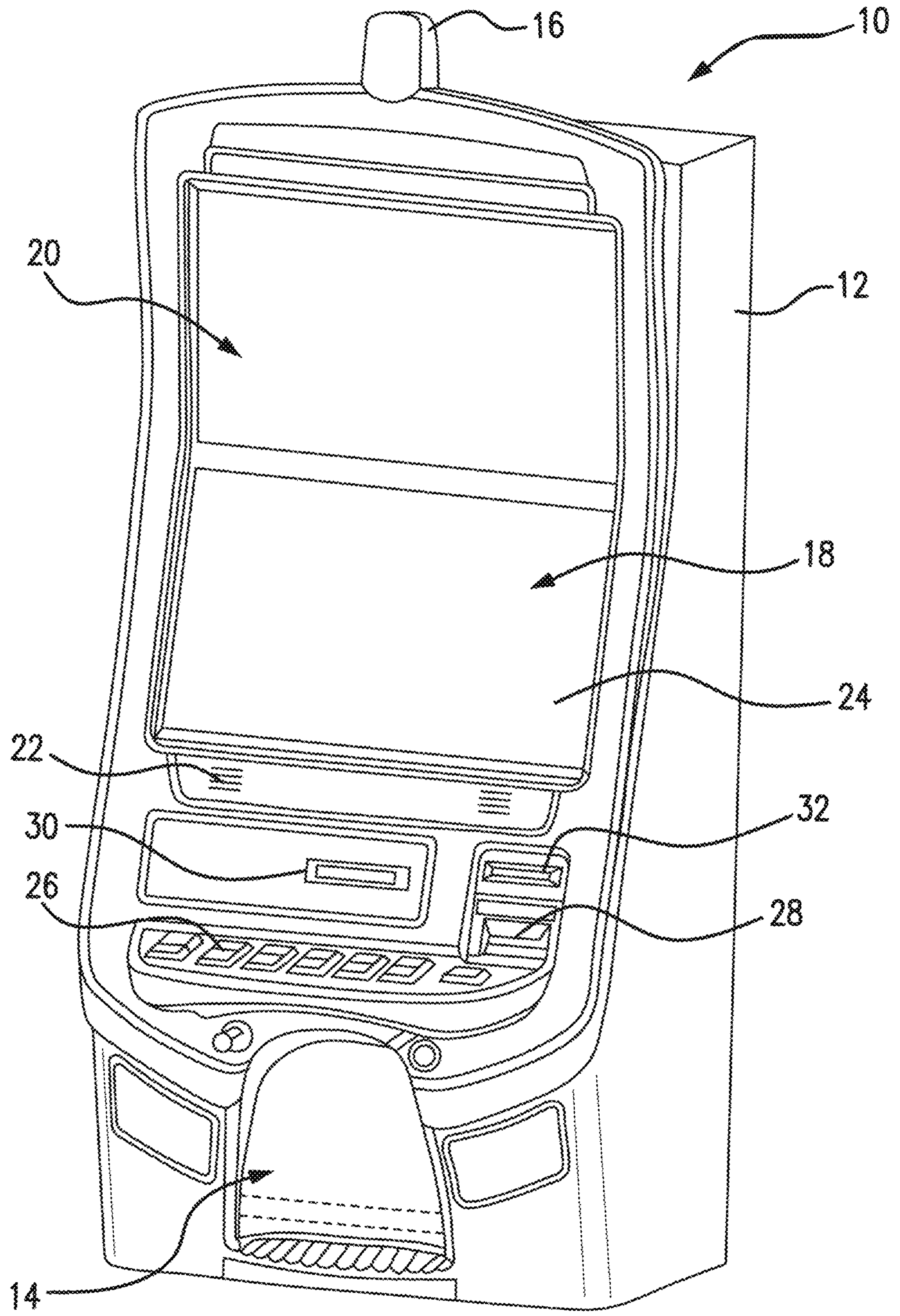
FIG. 1 is a perspective view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 200 (see FIGS. 4-8). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 200 (see FIGS. 4-8), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
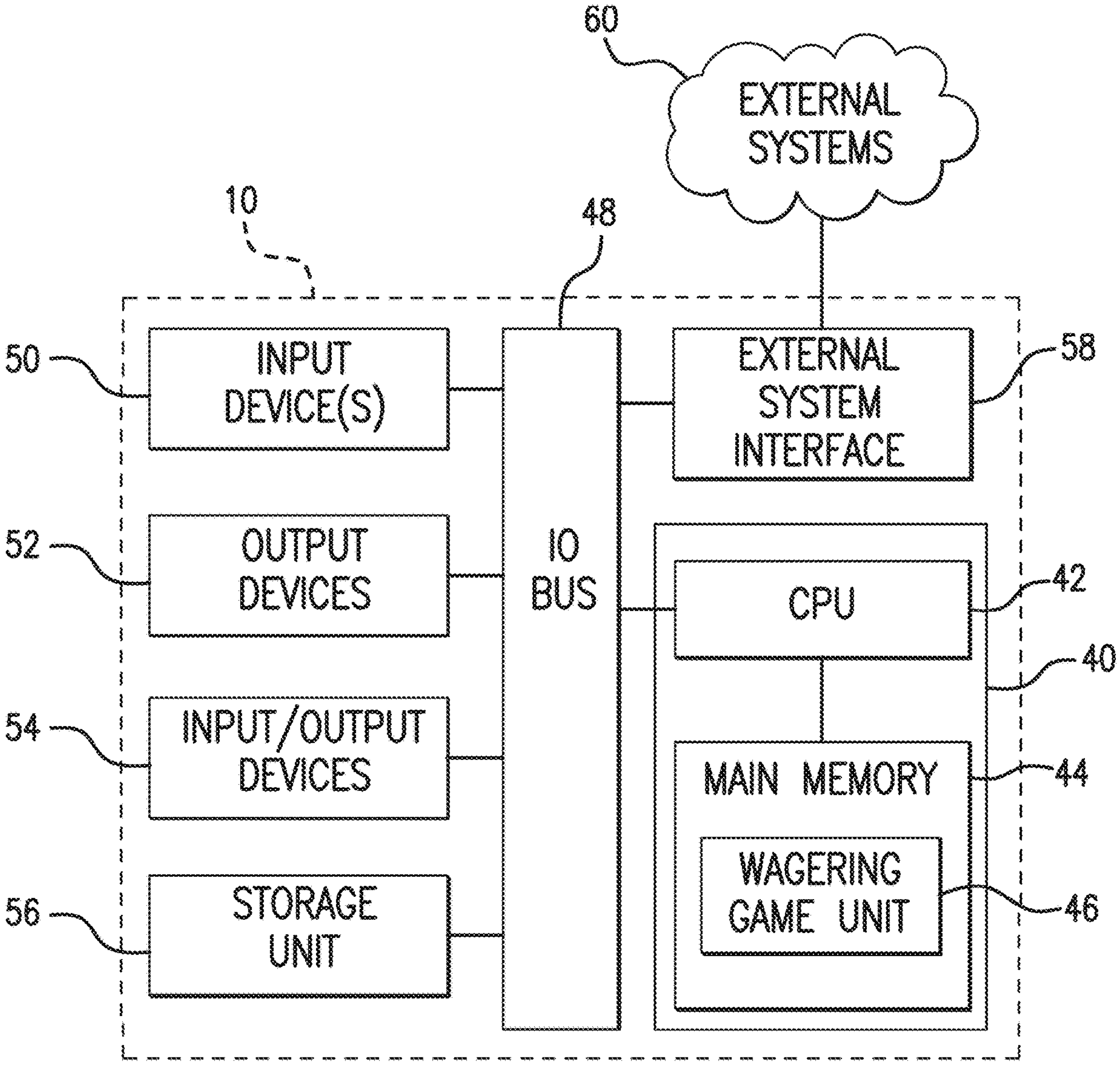
FIG. 2 is a schematic view of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Figure 3:
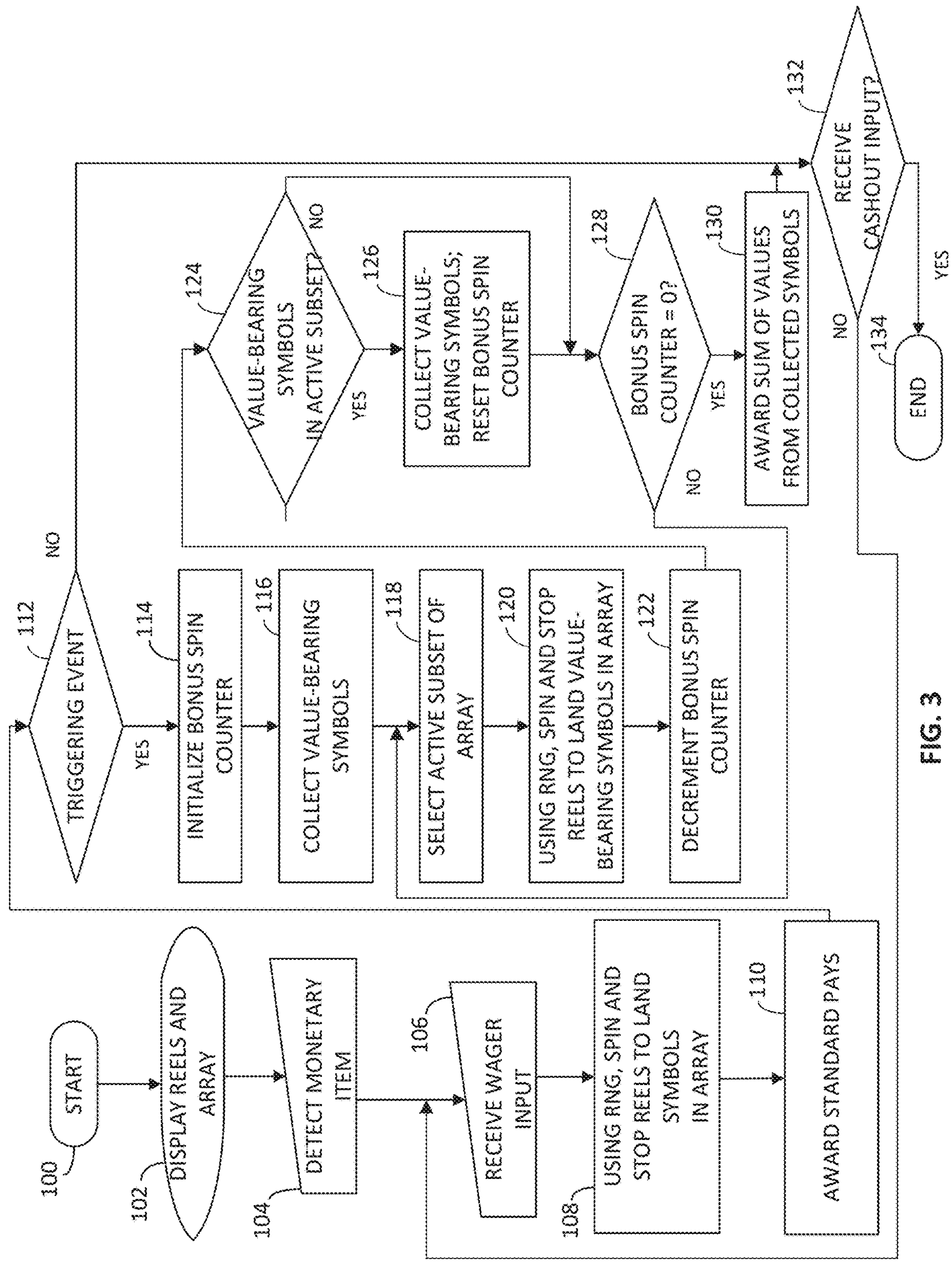
FIG. 3 is a flowchart for a data processing method that corresponds to instructions executed by a controller, according to an embodiment of the present invention.

Referring now to FIG. 3, there is shown a flowchart representing one data processing method corresponding to at least some instructions stored and executed by the game-logic circuitry 40 in FIG. 2 to perform operations according to an embodiment of the present invention. The data processing method is described below in connection with an exemplary representation of a set of game presentations in FIGS. 4-11.

The data processing method commences at step 100. At step 102, the game-logic circuitry controls one or more presentation devices (e.g., mechanical-reel display device, video display device, or a combination thereof) that presents a plurality of symbol-bearing reels and an array of symbol positions. Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. The number of symbol positions in different rows and/or different columns may vary from each other. The reels may be associated with the respective columns of the array such that the reels spin vertically and each reel populates a respective column. In another embodiment, the reels may be associated with the respective rows of the array such that the reels spin horizontally and each reel populates a respective row. In yet another embodiment, the reels may be associated with respective individual symbol positions of the array such that each reel populates only its respective symbol position.

In the examples shown in FIGS. 4-11, the presentation device presents a three-by-five array 230 comprising three rows 220, 222, 224 and five columns 210, 212, 214, 216, 218. Each column is associated with a respective reel such that the reel populates the three symbol positions in the associated column. The reels bear a plurality of symbols. In one embodiment, the plurality of symbols include standard symbols A, B, C, D, E, and F and value-bearing symbols V. Each value-bearing symbol V is associated with a credit or currency value indicated on the symbol itself. The value on a particular symbol V may be fixed or variable (e.g., random) from one game cycle to the next. Different value-bearing symbols V on the reels may have different values. In one or more embodiments, a value-bearing symbol V may be associated with a value determined separately. For example, rather than a specific amount, a GRAND, MAJOR, MINOR, or MINI progressive label may be indicated on a value-bearing symbol V. Each reel may contain one or more stacks (i.e., clumps) of value-bearing symbols V that appear adjacent to each other along the reel. The values of the value-bearing symbols V in any given stack may be the same or different. A stack of value-bearing symbols V may consist of two, three, four, or more adjacent symbols V. Further, adjacent reels may contain one or more "mega" value-bearing symbols V that move as one block as the reels spin. When the spin is complete, each individual row and column of the array underlying any visible portion of the "mega" symbol is assigned the value associated with the "mega" value-bearing symbol. For example, a "mega" value bearing symbol may comprise a two row high square spanning columns 212 and 214. If this symbol stops aligned with rows 220 and 222, the symbols at row 220, column 212, row 220, column 214, row 222, column 212 and row 222, column 214 would all be treated as though individual value-bearing symbols V having the value of the "mega" symbol had landed in those locations.

Returning to FIG. 3, at step 104, the game-logic circuitry detects, via a value input device, a physical item associated with a monetary value that establishes a credit balance. As shown in FIGS. 4-11, the credit balance may be shown on a credit meter 200 of the gaming machine.

At step 106, the game-logic circuitry initiates a wagering game cycle in response to an input indicative of a wager covered by the credit balance. To initiate a spin of the reels, the player may press a "Spin" or "Max Bet" key on a button panel or touch screen. As shown in FIGS. 4-11, the wager may be shown on a bet meter 202.

At step 108, using an RNG, the game-logic circuitry spins and stops the reels to randomly land symbols from the reels in the array in visual association with one or more pay lines (also known as lines, ways, patterns, or arrangements). The reel spin may be animated on a video display by depicting symbol-bearing strips moving vertically across the display and synchronously updating the symbols visible on each strip as the strip moves across the display.

The method illustrated describes a base game and a bonus game triggered during play of the underlying base game. In one or more alternate embodiments, the concepts of collecting value-bearing symbols from within an active subset of an array may apply to a base game, a bonus game, or both. The bonus game may be a series of free spins utilizing steps 102 and 112 through 128 of the method in FIG. 3. The number of free spins may be fixed or variable, but in the illustrated embodiment, when the bonus game commences, a spin counter may be initialized to a reset value, such as three. The spin counter decrements after each free spin but may be reset whenever a value-bearing symbol lands in the active subset of the bonus array (which will be shown later during the discussion of step 126). The series of free spins continues until the spin counter reaches zero, at which point the bonus game ends and the method returns to the base game.

Figure 4:
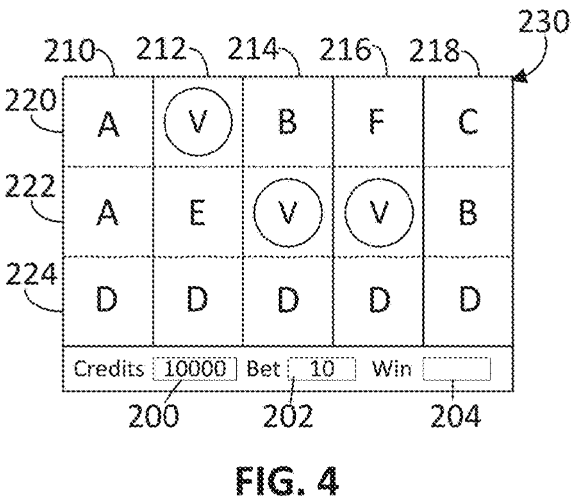
FIGS. 4-11 illustrate examples of game presentations corresponding to various steps presented in FIG. 3.

At step 110, the game logic circuitry awards standard pays in accordance with a pay table. The pay table may, for example, include "line pays" and "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Each payline preferably consists of a single symbol position in each column of the array. The number of paylines may be as few as one or as many as possible given each payline consists of a single symbol position in each column of the array. To animate a standard pay, the display may apply a border, pattern, color change, background change, watermark, or other distinguishing characteristic to the winning payline and/or winning symbols that contributed to the pay. In the example shown in FIG. 4, standard pays are limited to line pays along three horizontal paylines starting from the left-most reel: a first payline spanning the middle row 222 of the array 230, a second payline spanning the top row 220 of the array 230, and a third payline spanning the bottom row 224 of the array 230. FIG. 4, for example, depicts a line pay of five D symbols along the bottom row 224 of the array 230. The awarded pays are added to the win meter 204 and the game logic circuitry proceeds to step 112.

At step 112, the game-logic circuitry determines whether a bonus triggering event has occurred. In the embodiment shown, the triggering event comprises at least a certain number of value-bearing symbols V landing in the array in the current game cycle, for example, 4. In one or more alternate embodiments, the game-logic circuitry may employ other means to determine a triggering event for the bonus. For example, without limitation, the triggering event may be based on a random determination using the RNG, when one or more scattered non-value-bearing symbols appear, after a certain number of base game non-bonus spins have occurred, etc. If no triggering event has occurred, for example, the array does not contain a sufficient number of value-bearing symbols V, as shown in FIG. 4, the game-logic circuitry immediately proceeds to step 132.

If, however, a triggering event has occurred, the game-logic circuitry instead continues step 114, where it initializes a bonus spin counter 232 to a reset amount, for example, 3. In the illustrated embodiment, 4 or more value-bearing symbols V trigger the bonus. At step 116, these triggering symbols are moved to a collection area, their values to be awarded at the conclusion of the bonus. By way of example, if the spin generates the array of symbols shown in FIG. 5 (which includes 4 value-bearing symbols in columns 212, 214 and 216), the game-logic circuitry removes the value-bearing symbols from the array to the collection area 234, as shown in FIG. 6. To animate this collection, the display may apply a border, pattern, color change, background change, watermark, or other distinguishing characteristic to the value-bearing symbols in the array and then individually animate moving each value-bearing symbol from its place in the array to the collection area 234.

Figure 7:
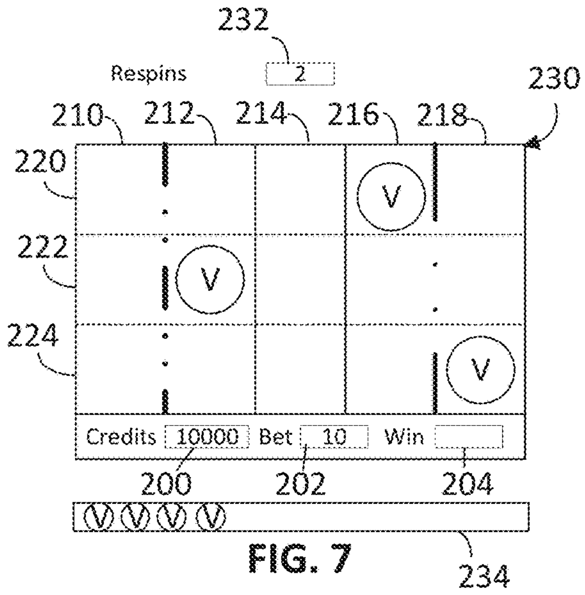
Figure 8:
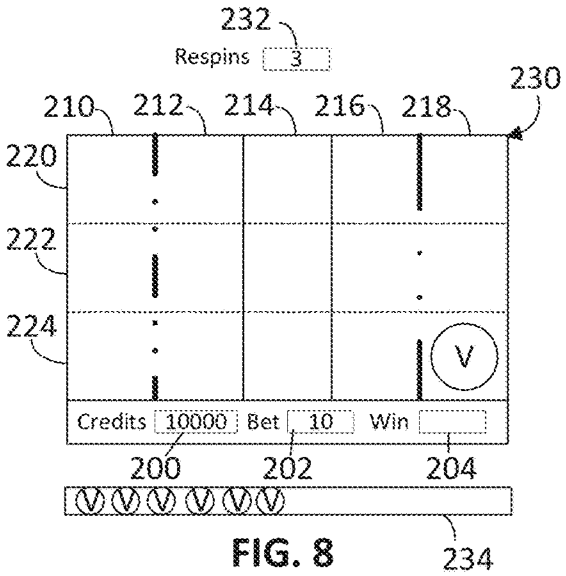

At step 118, the game-logic circuitry designates certain columns as an active subset of the bonus array. In the illustrated embodiment, the active subset is randomly selected at step 116 prior to each bonus spin. For example, as illustrated in FIGS. 7-8, columns 212-216 are the active subset; in FIG. 9, column 216 is the active subset; in FIG. 10, columns 212-214 are the active subset and, in FIG. 11, columns 214-216 are the active subset. In alternate embodiments, the active subset may be selected once and remain fixed for all bonus spins or some other method, without limitation, may be used to determine the active subset of the bonus array.

At step 120, again using the RNG, the game-logic circuitry spins and stops the reels to randomly land value-bearing symbols from the reels in the bonus array. As above, the reel spin may be animated on a video display by depicting symbol-bearing strips moving vertically across the display and synchronously updating the symbols visible on each strip as the strip moves across the display. At the conclusion of the bonus spin, the bonus spin counter is decremented at step 122, as shown in FIG. 7.

At step 124, the game-logic circuitry determines whether or not the active portion of the bonus array contains a value-bearing symbol V. If not, the game-logic circuitry proceeds to step 128.

If, however, by way of example, the spin generates the array of symbols shown in FIG. 7 (which includes value-bearings symbols in columns 212 and 216), the game-logic circuitry, at step 126, moves the two value-bearing symbols V to the collection area 234 (see FIG. 8). Again, to animate this collection, the display may apply a border, pattern, color change, background change, watermark, or other distinguishing characteristic to the value-bearing symbols in the active subset and then individually animate moving each value-bearing symbol from its place in the array to the collection area 234. Because one or more value-bearing symbols V were collected, the game logic circuitry also resets the spin counter 232 to its reset value, in this case, 3. FIG. 8 illustrates the conclusion of the collection and counter-resetting process. The number of value-bearing symbols V in the collection area 234 has increased from 4 (in FIG. 6) to 6 and the spin counter has been reset from 2 (in FIG. 7) to 3. It should be noted that the value-bearing symbol V in column 218 of FIG. 7. was ignored because it was not in the active portion of the bonus array, columns 212-216. However, as described above, is some embodiments, value-bearings symbols V that land outside the active subset of the array may also be collected if certain conditions are met.

At step 128, the game logic circuitry determines whether any bonus spins remain on the spin counter. If so, it returns for another bonus spin starting at step 118. (See FIGS. 9-11) However, if no bonus spins remain, it sums the values of each of the collected value bearing symbols in the collection area 234 at step 130. As noted above, these may be amounts directly indicated on the collected value-bearing symbols V or, if the indicated amount was an indirect amount (such as a reference to a progressive award), the value of the indirect amount is resolved and added to the sum. The total is then awarded by displaying it on the win meter 202 and adding it to the credit meter 200. At this point, the game circuit logic terminates the bonus spins and proceeds to step 132.

At step 132, the game-logic circuitry determines whether it has received a cashout input via at least one of the one or more player input devices of the gaming machine. If it has not received a cashout input, the game-logic circuitry waits for the next wager input at step 106. If it has received a cashout input, the game-logic circuitry initiates a payout from the credit balance on the credit meter such as the meter 200 in FIGS. 4-11 and the data processing method ends at step 134.

In the description of each of FIGS. 4-11 below, reference is made to certain applicable steps from FIG. 3.

Referring to FIG. 4, which illustrates an example of the display at the conclusion of a representative base game spin (steps 106-108):

- The appearance of five D symbols in row 224 (step 108) may generate a standard pay award (step 110).
- Three value-bearing symbols V landed in columns 212, 214, and 216 (step 108). Because there are less than 4 value-bearing symbols in the array (step 112), there are not enough trigger symbols to trigger a series of bonus spins.

Figure 5:
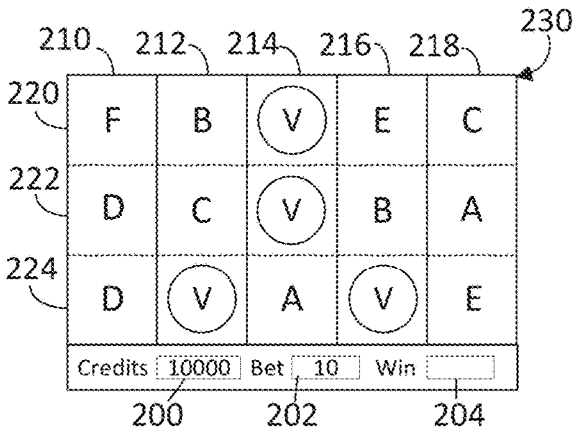
Figure 6:
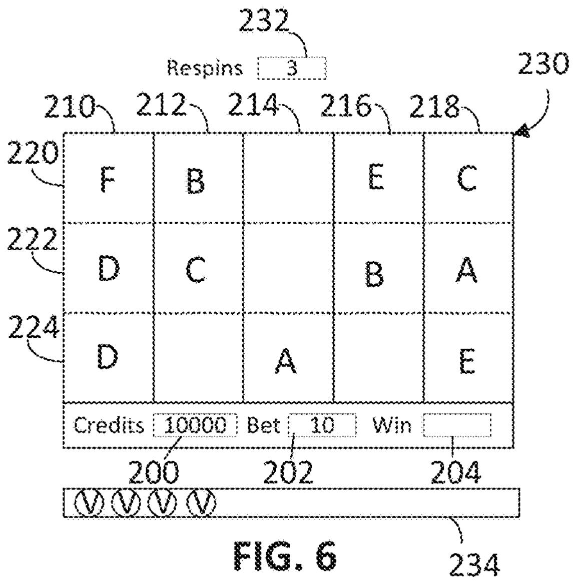

Referring to FIG. 5, which illustrates the display at the conclusion of a second base game spin (steps 106-108):

- Four value-bearing symbols V landed in columns 212, 214, and 216 (step 108).
- No standard pays appear in array 230 (step 110).

Referring to FIG. 6, which further illustrates changes to the display resulting from the second base game spin shown in FIG. 5:

- Because there were 4 or more value-bearing symbols in the array (step 112) shown in FIG. 5, there were enough trigger symbols to trigger a bonus game.
- The four value-bearing symbols V shown in the array in FIG. 5 have been moved to collection area 234 (step 116).
- The bonus spin counter 232 has been initialized to 3 (step 114) in preparation for a series of bonus spins.

Referring to FIG. 7, which illustrates an example of the display at the conclusion of a representative first bonus spin (steps 114-126):

- The broken lines to left of column 212 and to the right of column 216 indicate that columns 212, 214 and 216 had been selected as the active subset of the bonus array (step 118). This is merely an example; any indication of the current active subset of the bonus array may be used.
- The entire array was populated with new symbols by using the RNG to spin and stop the reels in columns 210-218 (step 120). In the examples shown in FIGS. 7-11, during bonus spins, only value-bearing symbols are being used on the reels, however, in alternate embodiments, the reels may be populated with a mix of standard symbols and value-bearing symbols V. (See FIGS. 4-6.)
- Two value-bearing symbols V (one in column 212 and one in column 216) landed in the active subset of the bonus array, columns 212-216. A third value bearing symbol V landed in column 220, which is in the inactive subset of the bonus array. Note that it is possible that "mega" value-bearing symbols V may land only partially in the active subset of the bonus array. In this embodiment, only the underlying symbol locations within the active subset of the bonus array are considered for the purposes of value-bearing symbol V collection. In one or more other embodiments, all symbol locations underlying the "mega" value bearing symbol V may be considered for the purposes of value-bearing symbol collection, even though some of them may fall outside of the active subset columns. In still other embodiments, under certain conditions, all value-bearing symbols V in the bonus array, whether within the active subset or not, may be collectable. For example, an additional "collect all" symbol may be added to the symbols used during the bonus. If this symbol lands within the bonus array or, alternately, within the active subset of the bonus array, all value-bearing symbols V in the bonus array, whether within the active subset or not, may be collectable on that spin.

The bonus spin counter 232 was decremented (step 122) from 3 (as in FIG. 6) to 2.

Referring to FIG. 8 which further illustrates changes to the display resulting from the first bonus spin shown in FIG. 7:

Upon detection by the game logic circuitry (step 124), the two value-bearing symbols V that appeared in the current active subset of the bonus array in FIG. 7 have been moved to the collection area 234, increasing the number of value-bearing symbols V in the collection area 234 from 4 (FIG. 7) to 6.

The bonus spin counter 232 has been reset to 3 (step 126) from 2 (FIG. 7).

Figure 9:
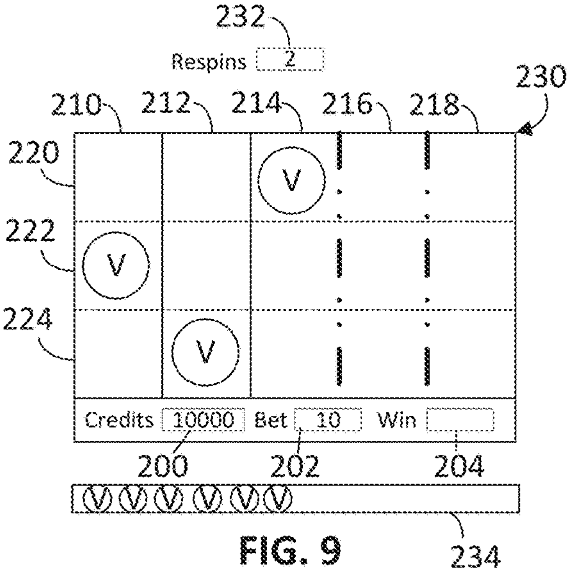

Referring to FIG. 9, which illustrates an example of the display at the conclusion of a representative second bonus spin (steps 114-126), initiated because the bonus spin counter was non-zero at the conclusion of the first bonus spin (step 128) illustrated by FIGS. 7-8:

The active subset of the array is limited to column 216 (step 118). As no value-bearing symbols V appeared in the current active subset of the bonus array, the value-bearing symbols V in columns 210, 212 and 214 were ignored and not collected. But, as described elsewhere, alternate embodiments may also collect value-bearing symbols V outside of the active subset of the array provided certain conditions are met.

The bonus spin counter 232 was decremented (step 122) from 3 (as in FIG. 8) to 2.

Figure 10:
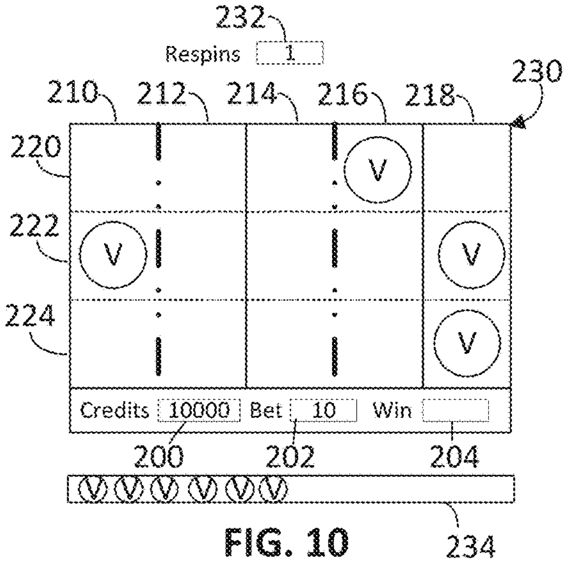

Referring to FIG. 10, which illustrates an example of the display at the conclusion of a representative third bonus spin (steps 114-126), initiated because the bonus spin counter was non-zero at the conclusion of the second bonus spin (step 128) illustrated by FIG. 9:

The active subset of the array is columns 212-216 (step 118). As no value-bearing symbols V appeared in the current active subset of the bonus array, the value-bearing symbols V in columns 210, 216 and 218 were ignored and not collected.

The bonus spin counter 232 was decremented (step 122) from 2 (as in FIG. 9) to 1.

Figure 11:
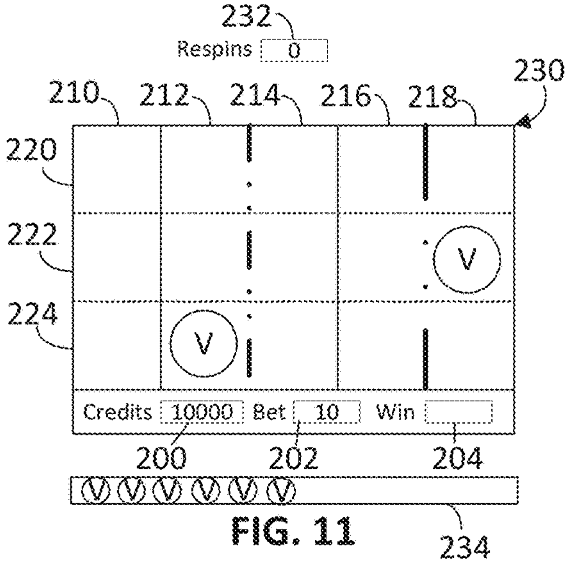

Referring to FIG. 11, which illustrates an example of the display at the conclusion of a representative fourth bonus spin (steps 114-126), initiated because the bonus spin counter was non-zero at the conclusion of the third bonus spin (step 128) illustrated by FIG. 10:

The active subset of the array is columns 214-216 (step 118). As no value-bearing symbols V appeared in the current active subset of the bonus array, the value-bearing symbols V in columns 212 and 218 were ignored and not collected.

The bonus spin counter 232 was decremented (step 122) from 1 (as in FIG. 9) to 0.

Because the bonus spin counter has been decremented to 0 (step 128), another bonus spin (steps 118-126) will not be initiated. The bonus game is terminated and normal game play (FIG. 4; step 106) resumes provided a cash out input is not received (step 130).

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the method comprising the operations of:

presenting, by a presentation assembly, a plurality of reels, an array and a collection area, the plurality of reels bearing a plurality of symbols, the plurality of symbols including value-bearing symbols; and conducting, by game-logic circuitry, a series of spins of the plurality of reels, each spin including:

randomly selecting an active subset of the array;

spinning and stopping the plurality of reels to land symbols from the plurality of symbols in the array;

with respect to any value-bearing symbols among the landed symbols, collecting any value-bearing symbols that landed in the active subset of the array in the collection area, but not collecting any value-bearing symbols that landed outside of the active subset of the array;

evaluating whether special conditions have been met; and if the special conditions have been met, collecting any value-bearing symbols that landed outside of the active subset of the array in the collection area; and at a conclusion of the series of spins, awarding a payout based on the values of the value-bearing symbols in the collection area.

2. The method of claim 1, wherein each value-bearing symbol is associated with a credit or currency value indicated on the symbol itself.

3. The method of claim 1, wherein each a value-bearing symbol may be associated with a value determined separately from an indication on the value-bearing symbol itself.

4. The method of claim 3, wherein the separately determined value is a progressive award.

5. The method of claim 1, further comprising:

detecting, via a value input device, a physical item associated with a monetary value that establishes a credit balance; and receiving, via at least one of one or more electronic input devices, a cashout input that initiates a payout from the credit balance.

6. The method of claim 1, further comprising:

receiving, via at least one of one or more electronic input devices, a wager input that initiates the series of spins.

7. The method of claim 1, wherein the special conditions comprise the appearance of a special symbol in the array.

8. The method of claim 7, wherein the special symbol is a collect all symbol.

9. The method of claim 1, wherein the special conditions comprise the collection of a predetermined number of value-bearing symbols.

10. The method of claim 1, wherein the special conditions comprise the occurrence of a randomly triggered event.

11. A gaming system comprising:

a gaming machine including a presentation assembly configured to present a plurality of reels, an array and a collection area, the plurality of reels bearing a plurality of symbols, the plurality of symbols including value-bearing symbols; and game-logic circuitry configured to perform the operations of:

presenting a series of spins of the plurality of reels, each spin including:

randomly selecting an active subset of the array;

spinning and stopping the plurality of reels to land symbols from the plurality of symbols in the array;

with respect to any value-bearing symbols among the landed symbols, collecting any value-bearing symbols that landed in the active subset of the array in a collection area, but not collecting any value-bearing symbols that landed outside of the active subset of the array unless special conditions have been met; and at a conclusion of the series of spins, awarding a payout based on the values of the collected value-bearing symbols.

12. The gaming system of claim 11, wherein each value-bearing symbol is associated with a credit or currency value indicated on the symbol itself.

13. The gaming system of claim 11, wherein each a value-bearing symbol may be associated with a value determined separately from an indication on the value-bearing symbol itself.

14. The gaming system of claim 13, wherein the separately determined value is a progressive award.

15. The gaming system of claim 11, further comprising:

detecting, via a value input device, a physical item associated with a monetary value that establishes a credit balance; and receiving, via at least one of one or more electronic input devices, a cashout input that initiates a payout from the credit balance.

16. The gaming system of claim 11, further comprising receiving, via at least one of one or more electronic input devices, a wager input that initiates the series of spins.

17. The gaming system of claim 11, wherein the special conditions comprise the appearance of a special symbol in the array.

18. The gaming system of claim 17, wherein the special symbol is a collect all symbol.

19. The gaming system of claim 11, wherein the special conditions comprise the collection of a predetermined number of value-bearing symbols.

20. The gaming system of claim 11, wherein the special conditions comprise the occurrence of a randomly triggered event.

* * * * *